Oct. 16, 1928.

W. H. FLINN

LATHE CENTER

Filed April 20, 1925

1,688,040

Inventor:
William H. Flinn
By
Attorneys.

Patented Oct. 16, 1928.

1,688,040

UNITED STATES PATENT OFFICE.

WILLIAM H. FLINN, OF DETROIT, MICHIGAN, ASSIGNOR, BY MESNE ASSIGNMENTS, TO PRECISION GAUGE & TOOL COMPANY, OF DETROIT, MICHIGAN.

LATHE CENTER.

Application filed April 20, 1925. Serial No. 24,478.

This invention relates to lathe centers and more particularly tailstock centers of the rotary type wherein the center proper is rotatable with the work in the machine. Heretofore, such rotary centers have generally comprised a thrust-bearing enclosed in a suitable mounting forming the journal for a center proper, but such devices have been usually found to be lacking in ability to withstand the wear attending use in high production work, especially when the work is of a heavy nature.

A further objection to these types of center, and also to the ordinary well-known fixed center, is that they make no allowance for expansion of the work which may result upon the generation of heat in the cutting operation so that upon such expansion not only is an undue strain put upon the center, but the tendency is to warp or throw the work out of alignment, which results in inaccurate machining. This is especially apparent in such operations as screw-cutting.

By my invention, it is proposed to effectively overcome the aforesaid objections in a simple manner which provides for longitudinal yielding of the center without impairing the axial alignment thereof, and which also provides for the resilient tendency to maintain the center in a forwardly extending position relative to its support whereby, when engaged with work, such engagement is longitudinally yieldable to a desirable degree, allowing for the expansion of work, permitting the center to be brought up to the work without the fine longitudinal adjustment usually required and resulting in absorption of vibration when the work is being machined which materially reduces chattering and drag in the machining operation.

The invention further aims to provide a center mounting comprising a longitudinally movable tapered roller bearing and a further bearing in which the center is longitudinally movable, said bearings being in a housing or holder and the stationary race member of the tapered bearing seated against resilient means tending to move the said bearing in the direction of the outer end of the center.

A still further object is to provide, in a device of the suggested type, a bearing-housing or casing, through an orifice in the forward end of which a rotatable center extends, and means carried by the said center sealing the said orifice against the escape of lubricant therefrom when the device is at rest, said sealing means being pressed into position by the resilient means effecting the forward thrust of the movable bearing.

Still further objects subsidiary to or resulting from the aforesaid objects, or from the construction or operation of the invention as it may be carried into effect, will become apparent as the said invention is hereinafter further described.

In carrying the said invention into effect, I may provide a center with a tapered roller bearing intermediate its length, which bearing is slidably mounted in a suitable housing adapted to be attached to the tailstock of a lathe or machine, resilient means exerting pressure on the outer or non-revolving race member of the said tapered bearing and yieldably pressing the said center forwardly, and a cover plate on the forward end of said housing through which said center projects and which limits the forward movement of said center. A suitable bearing is provided for the shank end of the center insuring free running and true axial alignment of the center with its housing, irrespective of longitudinal movement of the center which may be effected against or by the said resilient means.

All of which is more particularly described and ascertained hereinafter, by way of example, having reference to the accompanying drawing, in which:—

Similar characters of reference indicate similar parts in the several figures of the drawing.

Figure 1:
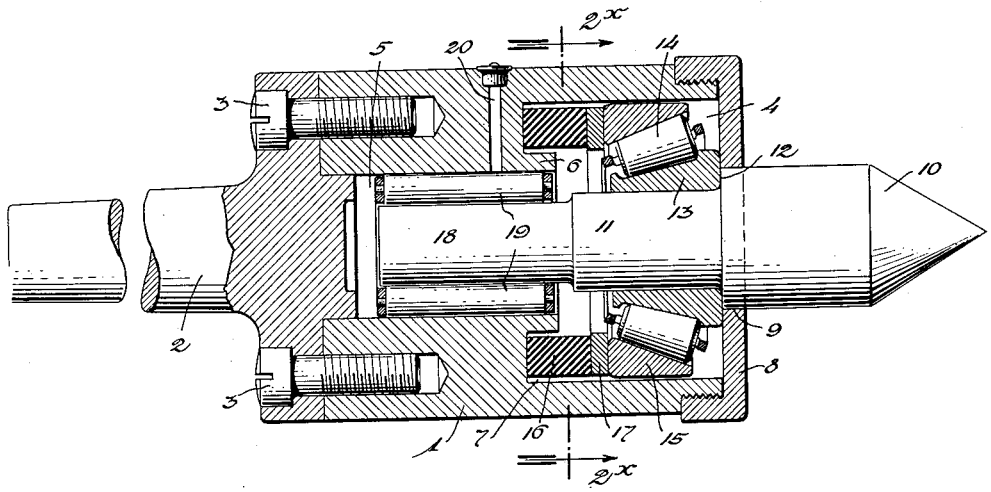
Figure 1 is a broken sectional elevation of a preferred form of the said invention.
Figure 2:
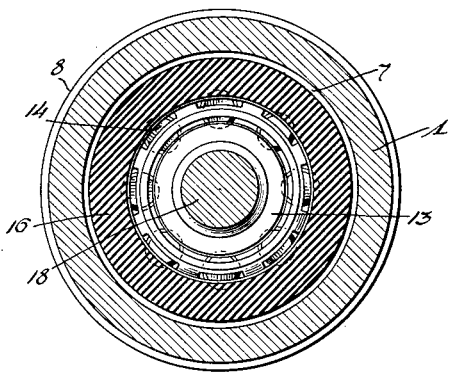
Figure 2 is a transverse section of the same taken on the line 2ˣ—2ˣ, Figure 1.

1 is a housing, to one end of which an interchangeable shank member 2 is secured by machine screws 3, said housing being tubular having a large chamber 4 in its forward part and a reduced bore 5 in the rearmost part thereof, whereby an intermediate shoulder 6 is formed, which is recessed at 7 for the purposes to be hereinafter explained.

8 is a cover plate or cap on the forward end of the housing provided with a central orifice 9 through which extends a center 10, which center is provided with a stem 11 of reduced diameter. 12 is a shoulder provided at the base of the head of the said center and secured upon the reduced stem of the center, in abutment with the said shoulder 12, is the internal race 13 of a tapered roller bearing which bearing includes the rollers 14 and the external race 15.

The center 10 and the internal race 13 are rotatable and the external race 15 is preferably non-rotatable in the said housing that is to say, although it may creep to some extent as is preferable, it does not freely rotate in the manner of the internal race; but the said external race is capable of longitudinal movement in the said housing, either rearwardly against the action of a resilient cushion 16, such as of rubber, or forwardly as a result of the resilient action of the said cushion, as far as may be permitted by the means limiting the longitudinal movement of the said bearing. In this case such forward movement is limited by the cover plate 8, which acts as an abutment for the internal race member 13, as will be quite apparent from an examination of the drawing.

A washer 17 is shown as being interposed between the race member 15 and the resilient member 16 for the protection of the adjacent face of the said resilient member, although where no rotation of the race member 15 can take place or where protection of the resilient member is not thought otherwise necessary, this washer may be dispensed with. It will be seen that the resilient member is effectively housed in the recess 7 against displacement.

The inner end 18 of the stem 11 of the center may be somewhat further reduced in diameter, if desired, and enters a roller bearing 19 located in the smaller bore of the housing, this bearing serving to more completely support the said center and permit its longitudinal movement while maintaining the axial alignment thereof unaltered.

20 is an oil duct through which lubricant may be admitted to the bearing 19, and to the chamber 4 for the lubrication of the tapered bearing, and it will be apparent that the engagement of the member 13 with the cover plate 8 will serve to prevent lubricant escaping through the orifice through which the center passes when the tapered bearing is in its forward position. When the device is in operation centrifugal force will tend to prevent the passage of lubricant through the central orifice of the cover plate to an extent which might be undesirable.

In operation, the shank 2 of the device is inserted in the spindle of the tail stock of the machine in which it is to be used, and said spindle adjusted until the center engages the work in a well known manner, except that, in this case, fine longitudinal adjustment of the center to secure just the right pressure on the work is not required, as after actual contact between the center and the work is established, the spindle of the tail stock may be still further moved toward the work to some extent, which will simply result in the housing sliding over the relatively movable tapered bearing and a partial compression of the resilient member 16. The spindle of the tail stock may then be locked in the usual manner.

Presuming, for example, that the work is in the nature of screw-threading, under high speed conditions such as is practiced in high production work, ordinarily chatter and drag have to be contended with and for this reason special forms of tool holders for the cutting tools have been employed, the specific nature of which it is not thought necessary to discuss herein, but even these devices very often fail to overcome the aforesaid chatter and drag, which would appear to be greatly due to vibration set up in the work itself. The improved center, however, due to its resilient thrust absorbs this vibration to an extent which greatly minimizes and to all practical intents and purposes eliminates this chatter, and incidentally the drag, so that the machining of the work is greatly facilitated and may, in many cases, be accomplished at a higher cutting speed than is ordinarily considered feasible. Thus, in the case of screw-cutting, a thread of better finish and truer form may be secured.

The heat generated in the work by the friction set up in the cutting operation also somewhat varies the dimensions of the work, and when provision is not made to allow the longitudinal expansion, the work is thrown out of truth and consequently the machining is inaccurate; but with the improved center, the resilient mounting of the center proper permits of its being forced still further into the housing, upon and by the expansion of the work, so that the said work is not warped or thrown out of truth in this manner. Consequently greater accuracy in the machine work may be secured.

Figure 3:
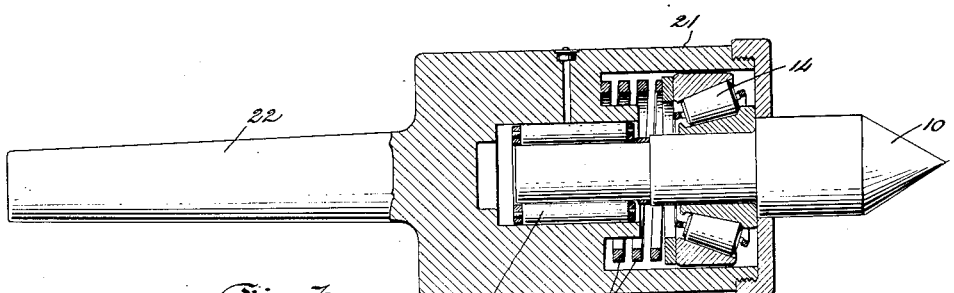
Figure 3 is a sectional elevation of a modified form of the device drawn to a somewhat smaller scale.

A somewhat simpler form of the device is shown in Figure 3, wherein the housing 21 is formed in one piece with the shank 22, an arrangement which is quite satisfactory where an interchangeable shank is not required, and a compression spring 23 is shown as forming the resilient cushion against which the external race of the bearing abuts.

It will be noted that the described arrangements ensure a pressure being exerted on the tapered roller bearing at all times so that both of the races are kept in constant contact with the rollers, and that no thrust bearing is required such as has been generally employed in revolving tailstock centers.

Furthermore, the longitudinal resiliency resulting in the avoidance of longitudinal rigidity such as exists in the ordinary type of revolving center referred to, eliminates one of the factors which ordinarily reduces the durability of revolving centers so that the improved device is well adapted for use in connection with heavy work where deep cuts are taken or where strains are set up which would otherwise result in the setting up of excess friction in a rotary center where no provision is made for resiliency therein, and especially in the main bearing thereof, as in the said improved device.

It will be readily understood that the bearing 19 may be fixed or may be reciprocable in the bore 4 of the housing if thought necessary or desirable, and as shown in Figure 3, a spacer 24 may be inserted between the forward and rear bearings to prevent the bearing 19 from moving too far forwardly.

This invention may be developed within the scope of the following claims without departing from the essential features of the said invention, and it is desired that the specification and drawing be read as merely illustrative and not in a limiting sense, except as necessitated by the prior art.

What I claim is:—

1. In a device of the class described, a housing, a center having limited longitudinally slidable movement in said housing, a longitudinally slidable tapered roller bearing including an external race, said center being mounted in said bearing, and resilient means exerting forward pressure against said external race and yieldably resisting the rearward movement thereof, said means effecting the automatic centering of said center through the medium of said external race.

2. In a device of the class described, a housing, a tapered roller bearing including a nonrotating external race, resilient means pressing said external race forwardly of said housing, and a center mounted in, movable with and automatically centered by said bearing, under the influence of said resilient means.

3. In a device of the class described, a housing, a longitudinally movable tapered roller bearing and a fixed roller bearing in said housing, a center solely mounted in said bearings, said center being reciprocable with said movable bearing and in said fixed bearing, and resilient means engaging said movable bearing and resisting the rearward movement of said center.

4. In a device of the class described, a housing, a tapered roller bearing including an outer race and an inner race mounted in said housing, a center slidably mounted in said bearing, a resilient member acting on said bearing and tending to drive the same out of the housing, a cover plate applied to one end of said housing and engageable by one of said races, said center having a portion in butt contact with one of said races.

In testimony whereof I affix my signature.

WILLIAM H. FLINN.